3,405,086
POLYEPOXIDE BINDER COMPOSITIONS AND
PROCESS FOR PREPARING SAME
Ype Schaafsma, Amsterdam, Netherlands, assignor to
Shell Oil Company, New York, N.Y., a corporation of
Delaware
No Drawing. Filed Aug. 10, 1964, Ser. No. 388,663
Claims priority, application Netherlands, Aug. 28, 1963,
297,207
4 Claims. (Cl. 260—31.4)

This invention relates to polyepoxide binder compositions. The invention is particularly related to the preparation of plasticized polyepoxide binder compositions which are especially suitable for surface dressings, flooring and wearing courses.

Specifically, the invention provides a curable binder composition which comprises (1) a polyepoxide having a vic-epoxy equivalency greater than 1.0, (2) a plasticizer to be more fully described hereinafter and (3) a curing agent.

There is a growing need for cheap compositions which can be applied to surfaces to improve their wearing qualities. Also, compositions are needed for application to roads to improve their non-skid properties. For bitumen courses interest is mainly focussed on surface dressings which are capable of improving their solvent-resistance. This is particularly important for bituminous runways for jet planes, because jet engine fuel rapidly attacks and softens asphaltic bitumen.

Various compositions have already been proposed for the above applications, but most of these suffer from one or more shortcomings, i.e., the adhesion of the (surface) dressing to the surface course such as cement, asphaltic bitumen, concrete or metal is often insufficient. In some cases the wearing qualities or non-skid properties are too poor or the resistance to solvents is insufficient. Also, it frequently occurs that the surface dressing is too brittle, as a result of which cracking develops, particularly when the dressing is applied to large surfaces. Sometimes the curing of the surface dressing requires much time or special curing conditions. Surface dressings free from the above drawbacks are in general too expensive for application to large surfaces such as roads.

Accordingly, the principal object of the present invention is to provide a surface dressing composition which has excellent flexibility, wearing qualities and solvent resistance. Another object is to provide polyepoxide compositions which are very suitable for imparting non-skid properties to cement, bitumens and metal surfaces and may, owing to their low viscosity, be used without solvents. Other objects will become apparent to those skilled in the art from the following disclosure.

It has been found that the present polyepoxide compositions containing the special plasticizer provide excellent surface dressings which meet very stringent requirements. The compositions also exhibit very good compatibility and storage stability. The cured compositions also exhibit excellent low-temperature properties.

The present composition may be described as a hardening composition prepared by mixing polyepoxy compounds, curing agents and plasticizers wherein the plasticizers are compounds which may be regarded as derived from polyhydroxy compounds by replacing therein at least one hydroxyl hydrogen atom by an acyl radical whose carbonyl group is bound to a tertiary or quaternary carbon atom and at least one hydroxyl hydrogen atom by an acyl radical or a hydrocarbyl radical.

The polyepoxide materials used in preparing the compositions of the present invention comprise those organic materials which have more than one vic-epoxy group, i.e., more than one

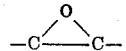
group, which group may be in a terminal position, i.e. a

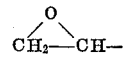
group, or in an internal position, i.e., a

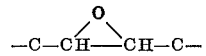

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy)diphenyl ether, 1,8 - bis(2,3-epoxypropoxy)octane, 1,4-bis(2,3-epoxypropoxy)cyclohexane, 4,4'-bis(2-hydroxy-3,4'-epoxybutoxy)-diphenyl dimethylmethane, 1,3 - bis(4,5-epoxypentoxy)-5-chlorobenzene, 1,4 - bis(3,4-epoxybutoxy)2-chlorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl)butane, 4,4' - dihydroxybenzophenone, bis(4 - hydroxyphenyl)ethane, 2,2 - bis(4 - hydroxyphenyl)pentane and 1,5-dihydroxynaphthalene. The halogen-containing epoxides may be further exemplified by 3-chloro-1,2-epoxybutane, 3 - bromo - 1,2 - epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxy-polyethers obtained by reacting, preferably in the presence of an acid-acting compound, such as hydrofluoric acid, or of the afore-described halogen-containing epoxides, such as epichlorohydrin, with a polyhydric alcohol, and subsequently treating the resulting product with an alkaline component meant to include those compounds having at least two free alcoholic OH groups and includes the polyhydric alcohols and their esters and ethers, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

The preparation of suitable such polyepoxide polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, di-glycidyl maleate, epoxidized dimethallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut and dehydrated castor oil, methyl linoleate, butyl linolinate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylene group in an internal position and polycarboxylic acids, such as, for example di(2,3-epoxybutyl)adipate, di(2,3-epoxybutyl)oxalate, di(2,3-epoxyhexyl)succinate, di(2,3-epoxyoctyl)tetrahydrophthalate, di(4,5 - epoxydodecyl)maleate, di(2,3-epoxybutyl)terephthalate, di(2,3-epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl) adipidate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4 - epoxypentanoate, 3,4-epoxyhexyl 3,4-epoxypentanoate, 3,4-epoxycyclohexyl, 3,4-cyclohexanoate, 2,3-epoxycyclohexyl-methyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyocatanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11 - diethyl - 8,9,12,13 - diepoxyeicosanedioate, dicyclohexyl 3,4,5,6 - diepoxycyclohexane - dicarboxylate, dibenzyl 1,2,4,5 - diepoxycyclohexane - 1,2 - dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,3-bis(cyclohexenyl)propane, 2,2 - bis(cyclohexenyl)-butane, 8,10 - octadecadiene and the like.

Polyepoxides having an epoxy equivalent weight of between 400 and 4000 are preferred. Polyepoxides having an average molecular weight above 500, as for example, between about 800 and 1500 and between about 2700 and 3100 are especially preferred. Very suitable polyepoxides are those formed from an epihalohydrin, and particularly epichlorohydrin, and a polyhydric compound, such as 2,2-bis(4-hydroxyphenyl)propane or glycerol.

The plasticizers of the present invention may be regarded as being derived from polyhydroxy compounds by replacing therein at least one of the hydroxyl hydrogen atoms by an acyl radical whose carbonyl group is attached to a tertiary or quaternary carbon atom and at least one of the hydroxyl hydrogen atoms by a hydrocarbyl radical or above-described acyl radical.

Preferably, the plasticizers used in compositions according to the invention are compounds containing not more than one free hydroxyl group attached to a aliphatic carbon atom. Very favorable results have been obtained by using plasticizers which may be regarded as being derived from aliphatic polyhydroxy compounds. Examples thereof are, for example, glycol, diethylene glycol, triethylene glycol, 1,3-propanediol, 1,4-butanediol, glycerol, trimethylolpropane and pentaerythriol. One preferably uses plasticizers which may be regarded as being derived from glycerol.

The hydrocarbyl radicals which may occur in the plasticizers involved may be saturated or unsaturated. They may be aliphatic, cycloaliphatic or aromatic and may contain substituents, provided these do not adversely affect the properties of the compositions.

Preferred hydrocarbyl radicals contain from about 5 to about 20 carbon atoms with benzyl and nonyl radicals being especially preferred. Compositions having outstanding properties are obtained when plasticizers are employed containing 3,5,5-trimethylhexyl radicals.

The acyl radicals of the present plasticizers are derived from saturated aliphatic monocarboxylic acids wherein the carboxyl group is attached to a tertiary or quaternary carbon atom. Hereinafter these acids will be referred to as alpha-branched saturated aliphatic monocarboxylic acids or simply alpha-branched acids.

The alpha-branched saturated aliphatic monocarboxylic acids which supply suitable acyl radicals may be represented by the general formula:

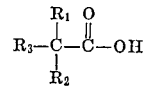

wherein $R_1$ and $R_2$ each represent the same or different alkyl radicals of normal, branched or cyclic structure and $R_3$ represents hydrogen or a hydrocarbyl radical. In the foregoing formula, $R_1$ and $R_2$ each may represent a member of the group consisting of for example, methyl, ethyl, propyl, butyl, pentyl, octyl, decyl, and the like, radicals. Hydrocarbyl radicals may comprise, for example, alkyl radicals of normal, branched or cyclic structure including methyl, ethyl, propyl, butyl, pentyl, hexyl, octyl, as well as alkaryl, aralkyl and aryl radicals. Very suitable such monocarboxylic acids include the alpha, alpha-dialkyl monocarboxylic acids having from 9 to about 22 carbon atoms in the molecule. A preferred group comprises the acids possesing from about 9 to 19 carbon atoms with those acids having from 9 to 11 and 15–19 carbon atoms being especially preferred. Suitable methods for their production are disclosed in U.S. 3,047,662, U.S. 3,059,005 and U.S. 3,059,006.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefine or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art. Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

The preferred plasticizers of the present invention may be described as an alkcarboxy-diol of the general formula

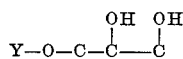

wherein a hydrogen of one of the hydrozyl groups is replaced by Y or X, a hydrocarbyl radical containing from about 5 to 20 carbon atoms, and wherein Y has the following general formula

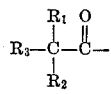

in which $R_1$ and $R_2$ are alkyl radials and $R_3$ is an alkyl radical or hydrogen and the sum of the carbon atoms in said acyl radical is from 9 to 19.

In other words, the preferred plasticizers may be represented by the following or mixtures thereof:

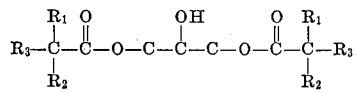

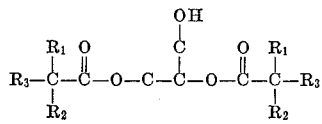

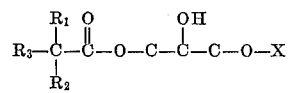

or

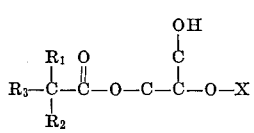

wherein the R's represent alkyl radicals or hydrogen as discussed above and X is a hydrocarbyl radical containing from 5 to 20 carbon atoms. Preferable hydrocarbyl radicals are the benzyl and 3,5,5-trimethylhexyl radicals.

Thus, the preferred plasticizers of the present invention may be regarded as being derived from one molecule of glycerol and two molecules of alpha-branched aliphatic saturated monocarboxylic acids or one molecule of glycerol, one molecule of the alpha-branched acids and one molecule of an alcohol such as benzyl or 3,5,5-trimethylhexanol.

Preferably, these plasticizers are simply prepared by reacting the glycidyl esters of the alpha-branched saturated aliphatic monocarboxylic acids with alpha-branched monocarboxylic acids and/or an alcohol containing from about 5 to about 20 carbon atoms such as amyl, hexyl, octyl, 3,5,5-trimethylhexanol, decyl, lauryl, cetyl, stearyl and benzyl alcohol.

The preparation of suitable alpha-branched saturated aliphatic monocarboxylic acids are described hereinbefore.

The preparation of the respective glycidyl esters of the alpha-branched saturated aliphatic monocarboxylic acids is described in copending patent application by Nantko Kloos and Jacquires J. J. Droost, Ser. No. 28,865, filed May 13, 1960, now U.S. 3,178,454, issued Apr. 13, 1965.

Briefly speaking, the glycidyl esters of the alpha-branched monocarboxylic acids may be simply prepared by reacting an acid salt of the monocarboxylic acid (for example, alkali metal salts or quaternary ammonium salt) with epichlorohydrin. This reaction is preferably carried out by gradually adding a liquid phase consisting of epichlorohydrin or containing the latter in a stream of a concentrated solution of an alkali metal hydroxide in a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

The monocarboxylic acid may also be reacted as such with epichlorohydrin with the use of nitrogen bases or salts thereof as catalysts. When monocarboxylic acids and epichlorohydrin are used in a stoichiometric ratio, or when an excess of dicarboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case, the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and corresponding bromine compounds may be used in the described processes instead of epichlorohydrin and chlorohydrin.

The compositions according to the invention are prepared by mixing the components at normal or at elevated temperature such as up to 150° C. or higher. If liquid polyepoxy compounds are used, the mixtures have low viscosities and the use of a solvent or diluent is unnecessary. If desired, however, solvents or diluents evaporating before or after curing may be added. Examples of suitable solvents for this purpose are hydrocarbons such as benzene and xylene. Sometimes, it may be advisable to use liquid polyepoxy compounds, such as the liquid glycidyl polyethers of polyvalent alcohols or monoglycidyl compounds such as butyl glycidyl ether or phenyl glycidyl ether.

The ratio of the two components in the compositions according to the invention may vary within wide limits. In general, however, the compositions will contain not more than 80% by weight of plasticizer. Very favorable results have been obtained with 30–50 parts by weight of plasticizer and 50–70 parts by weight polyepoxide.

As noted before, the compositions according to the invention are suitable not only for application in surface dressings, but also as binders for wearing courses on concrete, asphaltic bitumen and metal and as binder for aggregate in road building.

In case one wishes to use the compositions as binders for wearing courses, these compositions are mixed with finely divided hard inert particles. Suitable materials for this purpose are for example, sand, broken stone and ground quartz. Mixtures of various inert materials may be used together.

When the compositions are used as binders for aggregate used for the above applications are in general at least 50% by weight, and preferably 75 to 1000% by weight of the total quantity of composition to be used.

When wearing courses are applied and road ways are built, inert particles and aggregate may be added during or after preparation of the composition. When wearing courses are applied one preferably uses the composition as surface dressing, after which the inert particles are strewn on it and then rolled. When applied as surface dressing the compositions according to the invention may in general be applied to any surface. They have been found particularly suitable, for example, for dressing cement, asphaltic bitumen, wood and steel.

The compositions may be applied in thin as well as in thick layers. This may be done in the customary ways. If the composition is highly viscous or contains a large quantity of inert material, it is preferably done by trowel, spade or broom. If the composition has a low viscosity, application may be performed by brush or sprayer.

Many compounds are suitable for curing the resin-forming constituents in the composition. Examples are alkalis, such as sodium or potassium hydroxide; alkali phenolates such as sodium phenolate; carboxylic acids or anhydrides such as oxalic acid or phthalic anhydride; Friedel-Crafts metal halides such as aluminum chloride, zinc chloride, ferric chloride, or boron trifluoride, as well as complexes thereof with components including ethers; phosphoric acid and partial esters thereof, such as n-butyl ortho-phosphate and diethyl ortho-phosphate; and amino compounds such as triethylamine, ethylenediamine, diethylamine, diethylenetriamine, triethylenetetramine, N-aminoethylpiperazine, pyridine and piperidine. The curing agent is mixed with the composition after preparation of the latter. The quantity of curing agent to be used is, naturally, dependent on the type. The amine compounds are preferably used in quantities of from 5 to 15% based on the weight of polyepoxide.

The invention is illustrated by the following examples. The reactants, and their proportions, and other specific ingredients are presented as being typical and various modifications can be made in view of the foregoing disclosure, without departing from the spirit or scope of the disclosure or of the claims.

The parts recited in the examples are by weight unless otherwise designated.

The alpha-branched monocarboxylic acids ($C_9$–$C_{11}$) used in the examples were obtained by the reaction of cracked olefins containing 8 to 10 carbon atoms per molecule with carbon monoxide and water in the presence of a catalyst composed of phosphoric acid, boron trifluoride and water. They contained 9 to 11 carbon atoms per molecule and the carboxyl groups were attached to tertiary and/or quaternary carbon atoms. The sodium salts thereof were converted into the glycidyl esters by treatment with epichlorohydrin.

The plasticizers were obtained by reacting these previously prepared glycidyl esters of alpha-branched saturated aliphatic monocarboxylic acids ($C_9$–$C_{11}$) with alpha-branched saturated aliphatic monocarboxylic acids ($C_9$–$C_{11}$), benzyl alcohol and 3,5,5-trimethylhexanol, respectively.

The polyepoxy compounds employed in the examples are Polyether A, a glycidyl polyether of 2,2-bis-(4-hydroxyphenyl)propane having a viscosity of about 150 poises at 25° C., a molecular weight of about 350 and an epoxy value of 0.50 eq./100 g. (U.S. Pat. 2,633,458) and Polyether M (85% by weight Polyether A and 15% by weight glycidyl esters of alpha-branched, aliphatic saturated monocarboxylic acid ($C_9$–$C_{11}$)).

The following six compositions were prepared:

Composition I

| | Parts |
|---|---|
| Polyether M | 49.4 |
| N-aminoethylpiperazine | 10.6 |
| Reaction product of 1 mol of glycidyl esters of branched monocarboxylic acids ($C_9$–$C_{11}$) with 1 mol of branched monocarboxylic acids ($C_9$–$C_{11}$) | 40.0 |

Composition II

| | Parts |
|---|---|
| Polyether A | 48.8 |
| N-aminoethylpiperazine | 11.2 |
| Reaction product of 1 mol of glycidyl esters of branched monocarboxylic acids ($C_9$–$C_{11}$) with 1 mol of branched monocarboxylic acids ($C_9$–$C_{11}$) | 40.0 |

Composition III

| | Parts |
|---|---|
| Polyether M | 49.4 |
| N-aminoethylpiperazine | 10.6 |
| Reaction product of 1 mol of glycidyl esters of branched monocarboxylic acids ($C_9$–$C_{11}$) with 1 mol of 3,5,5-trimethylhexanol | 40.0 |

Composition IV

| | Parts |
|---|---|
| Polyether A | 48.8 |
| N-aminoethylpiperazine | 11.2 |
| Reaction product of 1 mol of glycidyl esters of branched monocarboxylic acids ($C_9$–$C_{11}$) with 1 mol of 3,5,5-trimethylhexanol | 40.0 |

Composition V

| | Parts |
|---|---|
| Polyether M | 49.4 |
| N-aminoethylpiperazine | 10.6 |
| Reaction product of 1 mol of glycidyl esters of branched monocarboxylic acids ($C_9$–$C_{11}$) and 1 mol of benzyl alcohol | 40.0 |

Composition VI

| | Parts |
|---|---|
| Polyether A | 48.8 |
| N-aminoethylpiperazine | 10.6 |
| Reaction product of 1 mol of glycidyl esters of branched monocarboxylic acids ($C_9$–$C_{11}$) and 1 mol of benzyl alcohol | 40.0 |

Example I.—Adhesion of the Compositions I–VI to asphaltic bitumen, concrete and stone The adhesion of two layers is often judged by reference to a tensile test, in which a force is exerted perpendicular to the area of adhesion. However, layers with very good adhesion according to such a tensile test frequently prove very easy to separate by exerting some force with a knife at the interface.

The knife test should therefore be regarded as a very stringent quality test, since if the point of the knife cannot be wedged between the two layers the adhesion is excellent.

Under the influence of traffic, shearing stresses will continually develop at the interface between a surface dressing and the road carpet; the situations then arising on road surfaces correspond with the knife test more accurately than with a tensile test.

To determine the adhesion of the Compositions I–VI, they were applied to freshly sawn asphaltic concrete, dry freshly sawn concrete tiles and freshly sawn pieces of river gravel in quantities of 1.1 kg./cm.² and cured at room temperature. After some days, it was tried to separate the two layers with a knife point at the interface and to pull the compositions in smaller or larger pieces from the substrate. All the compositions were very difficult to detach from the substrate; the adhesion is therefore excellent.

Example II.—Mechanical properties of the Compositions I–VI

The results of a number of tensile tests at various temperatures are listed in the following table. The measurements were made on "dumbbells" punched from a sheet of the composition tested. The rate of pull in all the tests was 18 mm./s.

|  | Composition | | | | | |
|---|---|---|---|---|---|---|
|  | I | II | III | IV | V | VI |
| Tensile strength, kg./cm.² at −20° C. | 550 | 550 | 550 | 600 | 390 | 450 |
| Tensile strength, kg./cm.² at +60° C. | 70 | 130 | 85 | 130 | 20 | 55 |
| Temp., ° C., at which tensile strength is equal to 200 kg./cm.² | 29 | 45 | 35 | 43 | 7 | 28 |
| Elongation at rupture, percent, at a temp. of −20° C. | 8 | 8 | 7 | 7 | 10 | 10 |
| Elongation at rupture, percent, at a temp. of 50° C. | 85 | 55 | 85 | 70 | 70 | 55 |
| Temp., ° C., at which the elongation at rupture is 10% | −15 | 10 | 10 | 30 | −20 | −20 |

I claim as my invention:

1. A curable binder composition comprising (1) from 50 to 70 parts by weight of a glycidyl polyether of 2,2-bis-(4-hydroxyphenyl) propane, (2) from 30 to 50 parts by weight of a plasticizer prepared by reacting (a) glycidyl esters of alpha-branched, saturated, aliphatic monocarboxylic acids, said acids containing from 9 to 19 carbon atoms and having the general formula:

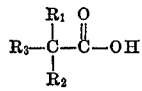

wherein $R_1$ and $R_2$ are alkyl radicals and $R_3$ is hydrogen or alkyl radical with (b) 3,5,5-trimethylhexanol and (3) an amine curing agent.

2. A binder composition as in claim 1 wherein the alpha-branched acids contain 9 to 11 carbon atoms.

3. A binder composition as in claim 1 wherein the amine curing agent is employed in quantities of from 5 to 15% by weight based on the glycidyl polyether.

4. A binder composition as in claim 1 wherein the amine curing agent is N-aminoethylpiperazine.

References Cited

UNITED STATES PATENTS 2,907,724  10/1953  Greenlee _____ 260—18
3,057,809  10/1962  Newey _____ 260—18

FOREIGN PATENTS 983,516  2/1965  Great Britain.
761,361  11/1956  Great Britain.
581,956  11/1955  Canada.

OTHER REFERENCES

C.A., 58, 1963, 14221d.
W. S. Woodcock, "Rubber Age," April 1951, 69(1), pp. 51–53 relied upon.

MORRIS LIEBMAN, *Primary Examiner.*

J. E. CALLAGHAN, *Assistant Examiner.*